United States Patent [19]
Laborde

[11] Patent Number: 5,303,287
[45] Date of Patent: Apr. 12, 1994

[54] INTEGRATED PERSONAL/CELLULAR COMMUNICATIONS SYSTEM ARCHITECTURE

[75] Inventor: Enrique Laborde, Gaithersburg, Md.

[73] Assignee: Hughes Aircraft Company, Los Angeles, Calif.

[21] Appl. No.: 929,603

[22] Filed: Aug. 13, 1992

[51] Int. Cl.$^5$ .............................................. H04B 7/204
[52] U.S. Cl. ........................................ 379/59; 379/60;
370/95.3; 455/33.1; 455/33.2; 455/33.4
[58] Field of Search ................... 370/95.1, 95.3, 69.1,
370/124; 379/59, 60; 455/33.1, 33.2, 33.4

[56] References Cited

U.S. PATENT DOCUMENTS

| | | | |
|---|---|---|---|
| 4,726,014 | 2/1988 | Goldman et al. | 455/33.1 X |
| 4,790,000 | 12/1988 | Kinoshita | 379/59 |
| 5,014,342 | 5/1991 | Pudsey | 455/33.1 |
| 5,067,147 | 11/1991 | Lee | 379/60 |
| 5,067,173 | 11/1991 | Gordon et al. | 455/33.1 X |
| 5,109,390 | 4/1992 | Gilhousen et al. | 455/33.2 X |
| 5,153,903 | 10/1992 | Eastmond et al. | 379/59 X |
| 5,175,758 | 12/1992 | Levanto et al. | 379/59 X |

*Primary Examiner*—Douglas W. Olms
*Assistant Examiner*—Russell W. Blum
*Attorney, Agent, or Firm*—Gordon R. Lindeen, III; Willliam J. Streeter; Wanda K. Denson-Low

[57] ABSTRACT

An integrated PCN/DCN system architecture has a switching center, coupled to a public switched telephone network (PSTN), which selectively transfers signals between the PSTN and a digital cellular network (DCN) or a personal communications network (PCN) which is allocated a portion of the cellular communications band by a local cellular operator. Each PCN subnetwork of the PCN includes several microcells arranged in a multi-dimensional grid, and the allocated cellular channels are divided into sets assigned to columns of the grid. The allocated portion of the cellular spectrum is reused within each PCN subnetwork by assigning the same set to more than one of the columns so that different communications signals can be transferred over the same cellular channels.

28 Claims, 4 Drawing Sheets

INTEGRATED PERSONAL/CELLULAR COMMUNICATIONS SYSTEM ARCHITECTURE

BACKGROUND OF THE INVENTION

1. Field of the Invention

The present invention relates to wireless communications networks, and, more particularly, to a personal communications network (PCN) and system architecture that enables integration of personal communications networks (PCN) and digital cellular networks (DCN).

2. Description of Related Art

A digital cellular network (DCN) is a mobile wireless telephone service in which radio coverage is divided into a network of cells and each cell is assigned a number of available radio frequencies. In the standard DCN, a base station transceiver system (BTS) transmits and receives control and voice communication information from a base station controller (BSC) within the same cell, and transfers the information to selected mobile users within the cell via a radio interface, such as, for example, the E-TDMA radio interface proposed by Hughes Network Systems, Inc. The base station controller (BSC) is controlled by a mobile switching center (MSC) that provides an interface to a public switched telephone network (PSTN) interface, and which provides mobility control across the cellular network. The mobile switching center (MSC) controls the transfer of communications information to selected base station controllers within the cellular network according to the position of the mobile user to whom the communications information is directed, to provide a roaming and handoff function between cells.

A personal communications network (PCN) is a mobile wireless telephone service for local use in environments in which the use of digital cellular communication is impracticable. Such environments include areas in which buildings or other structures cause undesirable signal transmission characteristics, or areas of high density telephony use. For example, a personal communications network may be configured as a private PCN (or radio PBX), to serve mobile users within an office building or plant, as a public PCN, for the high density telephony use areas, such as downtown areas, malls, and airports, or as a residential PCN where homes and condominiums are served by a local radio loop to outside base stations.

Numerous techniques have heretofore been proposed in the U.S. and Europe for the service of personal communications networks. These approaches typically involve a network of small cells which are served by a low-power radio interface. However, such systems generally require a radio interface different from that used in the digital cellular network. For example, personal communications systems are proposed that employ radio interfaces using Code Division Multiple Access (CDMA), while other systems (CT-2 and DECT) have adopted relatively wide band Time Division Multiple Access (TDMA) with Time Division Duplex (TDD) interfaces.

In addition, the allocation of frequency bands different from those committed to digital cellular communications has generally been required in such systems due to the scarcity of spectrum envisaged for PCNs sharing the cellular spectrum.

Thus, the basic disadvantages of the previously proposed PCN systems are that they require the use of different communications units for personal and cellular communications, different system infrastructures, and the allocation of different frequency bands.

Accordingly, from the user's perspective, it would be desirable to adapt PCN systems to cellular to eliminate the need for different communications units in different environments. For instance, cellular-based PCNs could enable the use of cellular portable units in the office, and new personal units could be made cellular-ready by car-based RF power boosters or by adherence to stringent distance limitations relative to the cellular base stations.

The major consideration in the adaptation of PCN to cellular to achieve the above advantages is the ability of the frequency spectrum currently allocated to cellular to support both cellular traffic and the multitude of localized high traffic densities usually associated with PCNs.

SUMMARY OF THE INVENTION

One object of the present invention is to provide an integrated personal/cellular communications system architecture for serving both personal and cellular mobile users over channels of the existing cellular band.

Another object of the present invention is to provide a personal communications network (PCN) for use over channels of the existing cellular band.

Another object of the present invention is to provide a personal communications network (PCN) which achieves a high degree of frequency reuse enabling enhanced network capacity over a relatively small number of allocated frequencies.

Another object of the present invention is to provide a personal communications network (PCN) which implements a dynamic channel allocation scheme to increase efficiency in serving traffic demands with large spatial and temporal variabilities characteristic of PCNs.

Another object of the present invention is to provide a personal communications network (PCN) having a simplified handoff mechanism which enables a user to be followed across the PCN network with reduced network control overhead.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the present invention is an integrated personal/cellular system architecture comprising a switching center, coupled to a public switched telephone network (PSTN), the switching center including means for selectively transferring signals between the PSTN and a digital cellular network (DCN) or a personal communications network (PCN), the PCN being allocated a plurality of channels of the cellular communications band by a local cellular operator, wherein the PCN comprises a plurality of PCN subnetworks, and each of the PCN subnetworks comprises a plurality of microcells arranged in a multi-dimensional grid, the grid defining at least rows and columns of microcells, wherein the allocated cellular channels are divided into sets of cellular channels and each of the columns of the grid is assigned one of the sets for internal spectral reuse, and means for transferring signals between the switching center and personal communications units positioned within respective columns over the cellular channels in the sets assigned to the respective columns, wherein more than one of the columns are assigned the same set of cellular channels such that the transferring means transfers different signals within the PCN subnetwork over the same cellular channels, providing the internal spectral reuse.

In another aspect, the present invention is a personal communications network (PCN) for use over channels of the cellular communications band allocated to the PCN by a local cellular operator, comprising a plurality of PCN subnetworks, wherein each of the PCN subnetworks comprises a plurality of microcells arranged in a multi-dimensional grid, the grid defining at least rows and columns of said microcells, wherein the allocated cellular channels are divided into sets of cellular channels and each of the columns is assigned one of the sets for internal spectral reuse, and means for transferring signals between a switching center and personal communications units positioned within respective columns over the cellular channels in the sets assigned to the respective columns, wherein more than one of the columns are assigned the same set of cellular channels such that the transferring means transfers different signals within the PCN subnetwork over the same cellular channels, providing the internal spectral reuse.

It is to be understood that both the foregoing general description and the following detailed description are exemplary and explanatory only and are not restrictive of the invention, as claimed.

The accompanying drawings, which are incorporated in and constitute a part of this specification, illustrate various embodiments of the invention and together with the description, serve to explain the principles of the invention.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

Figure 1:
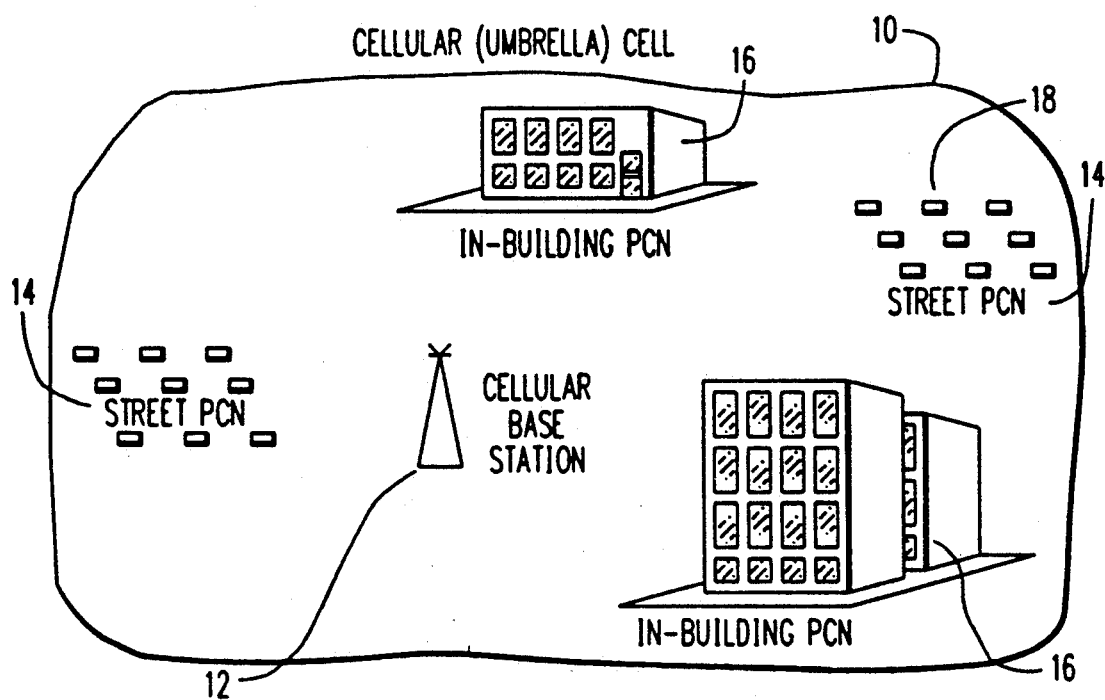
FIG. 1 is a context diagram of a cellular environment in which the present invention may be applied.

The integrated PCN/DCN system architecture of the present invention is configured for use in an environment of mobile users having varying mobility and being positioned in areas of diverse transmission characteristics and/or capabilities, as shown in FIG. 1. In such an environment, the integrated PCN/DCN system combines in-building PCNs 16 and street PCNs 14 with a cellular base station 12 to produce a single, two-tiered system providing overlapping coverage between large cellular cells 10 and small PCN cells, called microcells 18. In the integrated PCN/DCN system, the cellular base station 12 serves high-mobility users equipped with mobile, transportable, or portable communications units, while the in-building PCNs 16 and street PCNs 14 serve low-mobility users having personal communications units.

In the system of FIG. 1, cellular cells 10 form an umbrella providing continuous coverage between PCNs, whereas the street PCNs 14 serve dead-zone areas or small areas with high telephony traffic densities, such as commercial districts, and the in-building PCNs 16 serve areas within buildings, for example. The layout for the PCNs can be configured as linear, two-dimensional, or multi-dimensional arrays of microcells 18 characterized by a relatively small geometry, such as between 30 and 500 meters, for example, where each microcell is served by an inexpensive, easily deployable radio port.

Figure 2:
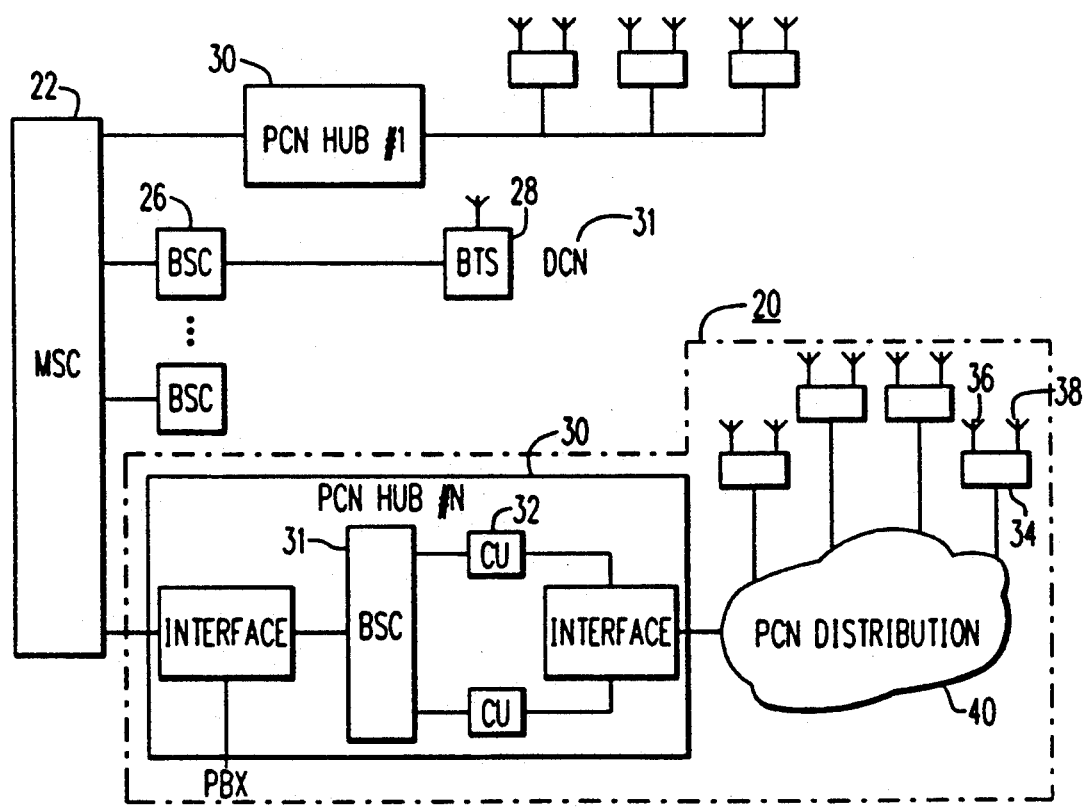
FIG. 2 is a schematic block diagram of the integrated PCN/DCN system architecture incorporating the present invention.

As shown in FIG. 2, each of the microcells 18 is equipped with a radio interface including a simple, low-powered (i.e. 3 Watts or less) radio port 34 which serves low-mobility users having low-powered (i.e. 25 milliwatts or less) personal communications units which are inexpensive, compact, and require low battery consumption. Ideally, the PCNs use identical radio ports independent of whether the radio ports 34 are used for in-building or street applications. The simplified radio ports can be low-powered repeaters having a functionality limited to amplification and frequency translation, for example.

In order to eliminate the uncertainties associated with the allocation of new bands and the coexistence or coordination overhead that new bands entail, the PCN of the present invention operates in the existing cellular band. As an example, the spectrum allocation for the U.S. digital vehicular cellular system (824–849, 869–894 MHz) consists of 25 MHz bands for transmit and receive. Each band provides 832 full-duplex, 30 kHz channels, where 12.5 MHz are assigned to each of two cellular operators in a geographical area. Because of the large difference in power levels between cellular and personal carriers, it is unlikely that carriers used over the cellular cell could be easily used on the imbedded microcells. Accordingly, the PCN of the present invention operates over a portion of the cellular spectrum allocated exclusively to the PCN by the local cellular operator.

As will become apparent from the description which follows, the fraction of the cellular spectrum committed to the PCN by the cellular operator can be small and need not form a contiguous block. Rather, the cellular frequencies allocated to the PCN may be individual frequencies dictated by the particular cellular operator and geographical area. As a reference, it may be assumed that a local cellular operator would initially allocate 1 MHz of the cellular spectrum, providing 33 frequencies, or 8% of the operator spectrum.

In view of the above spectrum scarcity, the assigned cellular frequencies must be used efficiently by the PCN. Therefore, the PCN of the present invention provides a high degree of inter-PCN frequency reuse between different PCN subnetworks 20 of the same cellular cell, and also enables extensive internal frequency reuse within each PCN subnetwork. The inter-PCN frequency reuse is implemented by positioning the different PCN subnetworks 20 according to minimum distance models or empirically defined distance and building loss characteristics to avoid inter-PCN interference. The internal frequency reuse within each PCN subnetwork 20 is made possible by unique features of the present invention discussed later in this description.

As herein embodied and shown in FIG. 2, the personal communications network (PCN) of the present invention consists of a plurality of PCN subnetworks 20 constructed to enable incorporation of the PCN into a standard digital cellular network (DCN) to provide an integrated PCN/DCN system architecture. An example of a suitable digital cellular network (DCN) is disclosed in U.S. patent application Ser. No. 07/622,232, filed Dec. 6, 1990, which is hereby incorporated by reference.

The high level system architecture integrating DCN and PCN has a mobile switching center (MSC) 22 which provides both the DCN and PCN with a public switched telephone (PSTN) interface. The MSC 22 transfers communications signals between the PSTN and the DCN and PCN, and, as in the standard DCN, provides both the DCN and PCN with roaming and hand-off capabilities to enable mobility control across the PCN and DCN networks. Cellular user access to system service is provided by a plurality of DCN subnetworks 31, each of which includes a base station controller (BSC) 26 and a base station transceiver system (BTS) 28. The BSC 26 provides call control, call processing, E-TDMA ™ processing, and mobility management for communications signals transferred between the MSC 22 and mobile users within the DCN subnetwork 31, while the BTS 28 includes centralized channel units which terminate the low level protocol used in the radio interface.

Access to personal communication services in the PCN subnetwork 20 is provided by PCN hub 30 which combines the functions of the BSC 26 of the standard DCN with centralized channel units 32 shared between the radio ports 34 of the PCN subnetwork. PCN hub 30 not only provides an interface for communication with MSC 22, but also can be connected to a private branch exchange, as illustrated in FIG. 2. The centralization of channel units 32 at the PCN hub 30 contributes to simplification of the radio ports 34. Radio ports 34, providing a radio interface to personal users in the microcells 18, include transmit and receive antennas 38 and 36, respectively, which may be low gain half-use dipoles with omini-directional azimuthal coverage, for example. The power of the transmit amplifier feeding the transmit antenna 38 is adjusted according to the maximum number of simultaneous carriers serving a microcell and the individual percarrier power requirements dictated by the propagation peculiarities of the microcell environment.

The channel units 32 of the PCN hub 30 and the radio ports 34 are interconnected by PCN distribution network 40 which provides bidirectional wideband transport of signals transferred between the channel units of the PCN hub and the radio ports. The distribution media used to connect the radio ports 34 to the PCN hub 30 must be selected according to certain technical requirements. For instance, such media must provide a bandwidth of at least 25 MHz in order to accommodate the cellular band, and must also provide controllable attenuation, low transmission delay, high dynamic range, and low intermodulation.

Although, in principle, the distribution media could constitute radio or wired systems, the relative short distance between the radio ports 34 and the PCN hub 30 favors wideband wired systems over radio. Among the available wideband wired alternatives are coaxial cable or optical fiber. CATV cable, in particular, provides satisfactory characteristics for the PCN distribution network. A typical 0.412 inch, 7.5 ohm, CATV cable has a 300–400 MHz bandwidth with 6 db attenuation losses and 0.4 microsecond transmission delay per 100 meters, and because of quantity use in the CATV industry, distribution elements (cable, amplifiers, taps) are reasonably priced.

Figure 3:
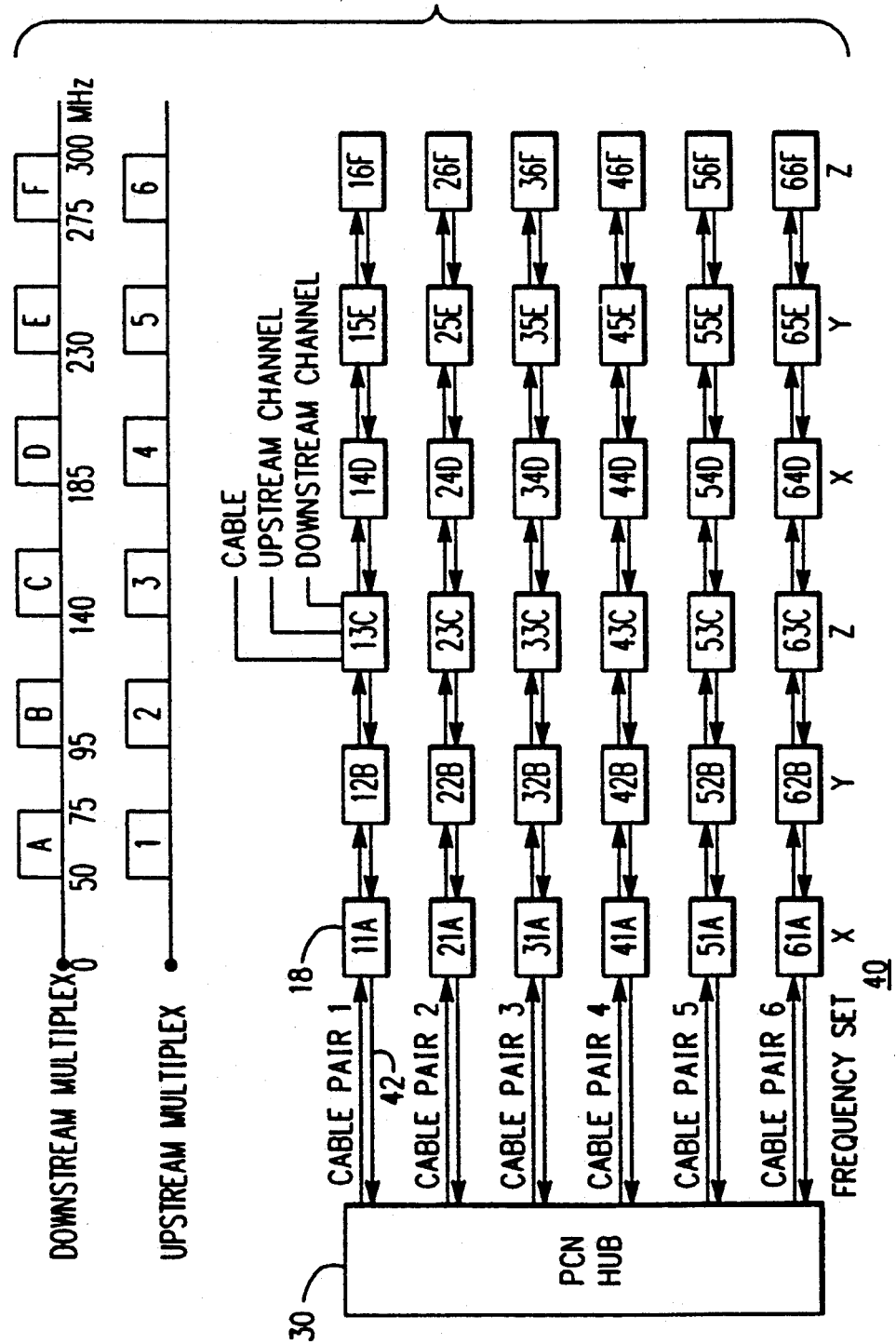
FIG. 3 is a schematic block diagram of a reference personal communications network incorporating the present invention.

For purposes of this description, it is assumed that the PCN subnetwork service area constitutes a substantially rectangular grid, defined by rows and columns of microcells 18, as shown in FIG. 3, wherein each microcell is served by a radio port 34 located at its center. However, it is noted that the form of the PCN subnetworks (20) may vary according to the characteristics of the service area. For instance, an in-building PCN subnetwork (20) may be defined by a three-dimensional array of microcells accommodating communication between personal users on different floors of the building.

Figure 4:
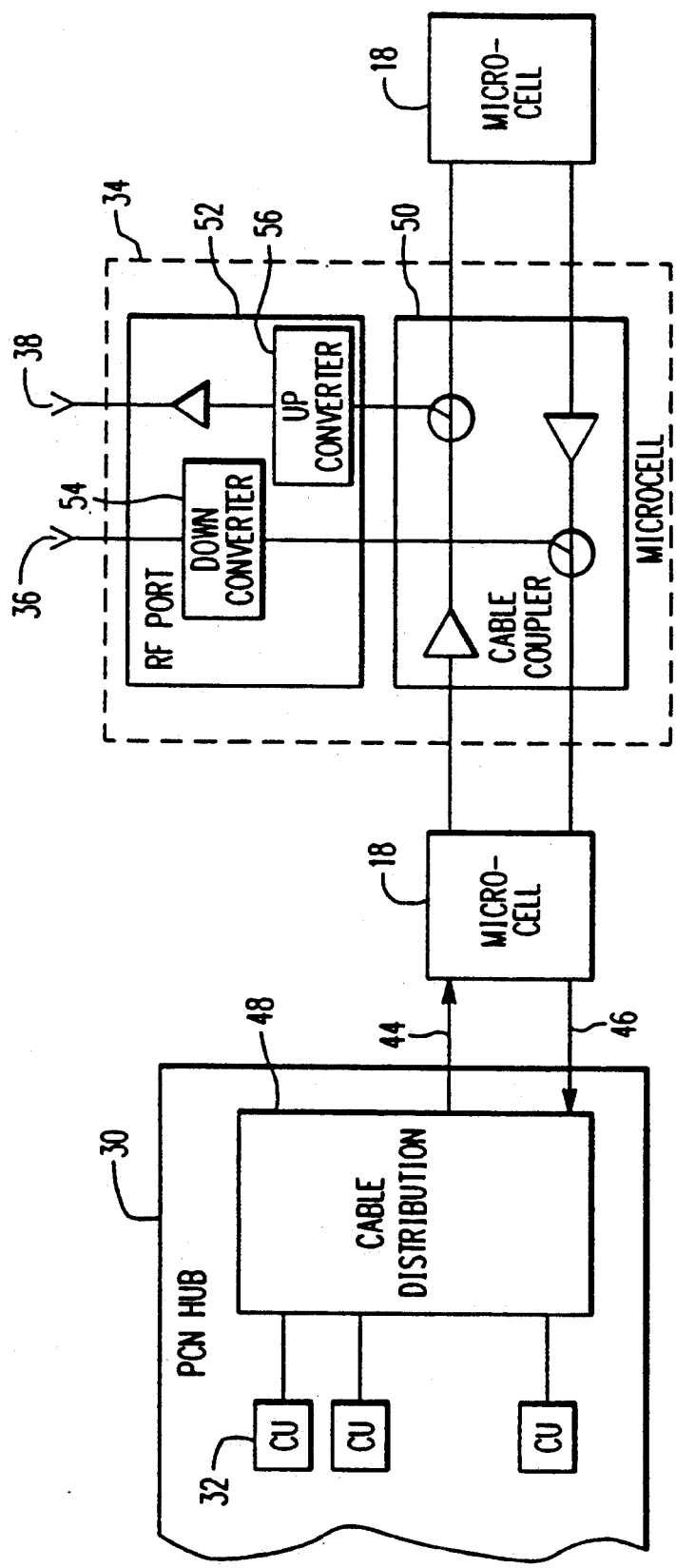
FIG. 4 is a schematic block diagram of a radio port in accordance with the present invention.

For simplicity, reference is made to the 6×6 service rid of FIG. 3. For this arrangement of microcells, PCN distribution network 40 connects the PCN hub 30 to multiple radio ports 34 covering the PCN subnetwork service area via coaxial cable pairs 42. Because of the large bandwidth and small transmission delay of the coaxial cables 42, several radio ports 34 can be attached to the same cable. As shown in FIG. 4, each coaxial pair 42 consists of a separate downstream transmit cable 44 and upstream receive cable 46 to reduce intermodulation products resulting from different amplifier levels.

As illustrated in FIG. 3, coaxial cables 44 and 46 commonly serve all of the radio ports 34 disposed in a common row of microcells 18 by the use of a cable frequency division multiplex (FDM), having several FDM channel bands, enabling the internal reuse of the frequencies allocated to the PCN. For the exemplary 6×6 grid of FIG. 3, the upstream cable FDM consists of six FDM channel bands A to F, and the downstream cable FDM consists of six FDM channel bands 1 to 6. One downstream FDM channel band is assigned to the downstream (transmit) direction and one upstream (receive) FDM channel band is assigned to the upstream (receive) direction of each radio port 34, according to the column of the grid in which the radio port is situated. In this way, each radio port 34 in a particular row of microcells can be served by the same downstream cable 44 and the same upstream cable 46.

Each FDM channel band covers the entire 25 MHz cellular spectral allocation for transmit and receive, with the six FDM channel bands being distributed over the approximately 300 MHz bandwidth of the cable. Therefore, since each channel band covers 25 MHz, it contains a corresponding channel for each channel in the entire 25 MHz cellular spectrum. Accordingly, the distribution network 40 and radio ports 34 can be configured independently of the particular cellular frequencies allocated to the PCN by the local cellular operator, and can accommodate the allocation of noncontiguous blocks of frequencies.

To implement internal frequency reuse in the 36 microcell reference grid of FIG. 3, the portion of the cellular spectrum made available to the PCN is divided into three sets of cellular carriers (X, Y, Z). This division of the cellular carriers provides a reuse factor of 3, which compares favorably to the typical reuse factor of 7 used in cellular systems with nonsectionized antennas. Each set of cellular carriers is assigned to alternate columns of microcells 18, such that the same set of carriers is assigned to more than one column of microcells, subject to minimum distance requirements for frequency reuse within the grid. Assuming the availability of 24 frequency pairs (6% of the cellular spectrum) for the reference PCN subnetwork of FIG. 3, each of the three carrier sets includes 8 carriers.

Figure 5:
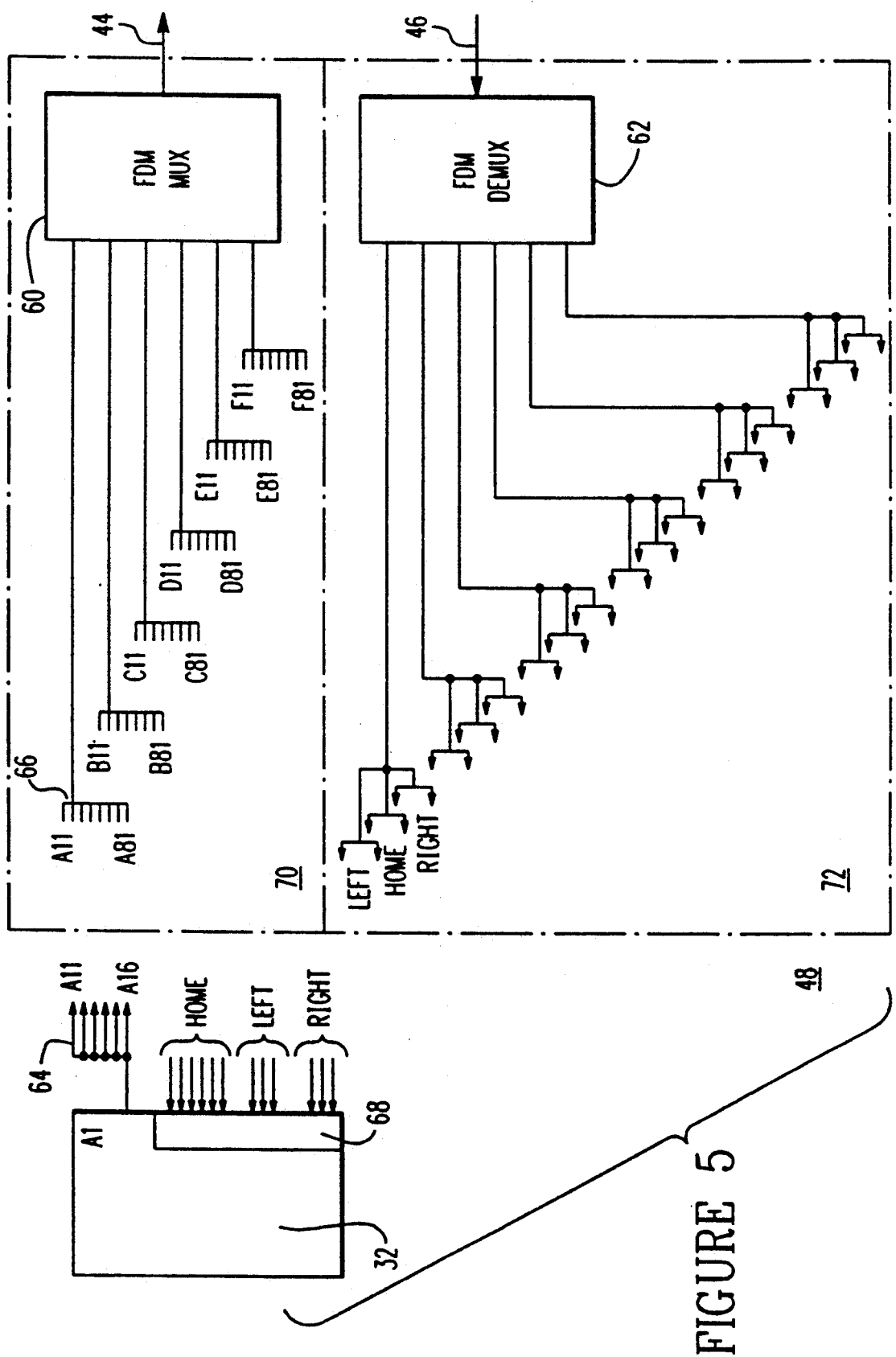
FIG. 5 is a schematic block diagram of a cable distribution network of the present invention.

As shown in FIG. 4, channel units 32 which terminate a particular set of cellular carriers at the PCN hub 30 are connected across all coaxial cables 44, 46 in the PCN distribution network 40 by cable distribution 48. For example, in the reference grid of FIG. 3, the channel units 32 terminating the Z set of carriers used in microcells 13C, 23C, 33C, 43C, 53C, and 63C must have their outputs transmitted over C channels in the downstream FDM multiplex, and must be configured to receive over the 3 channels in the upstream FDM multiplex. Accordingly, for downstream transmission, the transmit sides of channel units in a particular group are connected to a corresponding input of an FDM multiplexer 60, as shown in FIG. 5. The FDM multiplexer 60 converts the cellular channel signals transmitted to the input to the FDM channels in a particular downstream band corresponding to the appropriate set of cellular carriers.

Because of the small cell sizes in the PCN, and the mobility of PCN users, it is also desirable to design the PCN for the possibility of highly variable traffic patterns on the individual microcells with high peak-to-average ratio. To achieve this high traffic handling variability, the present invention includes a dynamic channel allocation scheme that permits moving channels between microcells on a highly dynamic, timely basis.

In principle, dynamic channel allocation with IS-54 type channel units located at the PCN hub could be done by dynamic time and/or frequency allocation. However, with dynamic time allocation, a channel unit 32 can assign time slots on a carrier to any particular microcell without changing frequencies. In the PCN distribution network 40, dynamic time allocation is implemented by connecting each channel unit 32 at the PCN hub 30 to the same FDM channels on different cables. In this way, microcells in the same column served by the particular FDM channels can be assigned any number of time slots (from 0 to 6 in the IS-54 channel unit) processed by the channel unit 32 without the need for frequency hopping. Thus, time slots from the set of IS-54 TDMA carriers preassigned to each column of microcells can be assigned to active users in any of the microcells in the corresponding column.

Using the dynamic time allocation scheme, each microcell 18 can be assigned 8×6 time slots in any combination according to the traffic demand. At the PCN hub, there are 48 channel units, divided into six groups A-F of eight channel units (A1-A8, ..., F1-F8), with each group of eight channel units serving a column of six microcells via the assigned cellular carrier set. As shown by the representative channel unit A1 in FIG. 5, each channel unit 32 is equipped with a six-way passive power splitter 64 on the transmit port, as shown in FIG. 5, that splits the channel unit output into six paths corresponding to the six downstream cables 44. The outputs of splitter 64 are connected via downstream cable distribution 70 to the FDM multiplexers 60 which serve respective downstream cables 44. This passive splitter arrangement eliminates switching times and settling times associated with active devices that are typically used in dynamic channel allocation schemes, and is made possible by the concept of simulcast, discussed below.

As illustrated in FIG. 5, the downstream cable distribution 70 connects one of the six paths produced by each channel unit in a group via passive combiner 66 to an input of the FDM multiplexer 60 corresponding to one of the six downstream cables 44. For example, paths from each of the channel units A1-A8 in group A which are to be connected to the downstream cable 44 serving the first row are designated A11-A81. FDM multiplexer 60 converts the signals applied to a particular input to the corresponding channels in the downstream band for transmission to the radio ports 34 over the downstream cables 44, such that signal from the A channel units are converted to FDM channels in the A FDM band, and so on. In this manner, the transmit sides of channel units 32 in groups A-F are connected across all of the downstream cables 44 in the distribution network via the respective A-F inputs of each FDM multiplexer 60 so that the channel unit outputs can be converted to channels in the appropriate FDM downstream band A-F.

Because the outputs of channel units 32 are connected across all of the downstream cables 44 and are transmitted according to the cable FDM, the time slots in each transmitted set of carriers are simulcasted in the downstream direction over all the microcells 18 assigned to the particular set of carriers eliminating the need for active switching devices. Thus, the signal received at a personal communications unit is reinforced by simulcasting, or, in other words, transmitting the same signal from adjacent microcells. This simulcast feature not only reduces the power requirements of the radio ports 34, but, importantly, enables simplification of the distribution network.

In order to operate according to the assigned FDM channels and carrier set, each radio port 34 (FIG. 4) includes a cable coupler 50 and an RF port 52. To respond with respect to the assigned FDM channel, each radio port 34 includes a cable coupler 50 tuned to the downstream and upstream FDM channels assigned to the radio port. Signals received from the connected downstream cable 44 by the cable coupler 50 over one of the assigned downstream FDM channels are translated to the corresponding channels of the assigned set of cellular carriers by up-converter 56 for transmission to personal users via antenna 38. Down-converter 54, tuned to the assigned set of cellular carriers, translates between cellular signals received from personal users by antenna 36 and the corresponding channels of the assigned upstream band. The signals converted by the down-converter 54 are then coupled to the upstream cable 46 by the cable coupler 50.

The transmit amplifier at the radio port can be a linear A/B amplifier for up to eight simultaneous carriers at 100 mW transmitted ERP. This represents a 2-watt saturated power amplifier operating at a 6 dB backoff. The downconverters 54 have a large dynamic range, i.e., −120 to −40 dBm, to accommodate both personal and cellular portable units, and provide filtering for isolation of the transmit and receive bands. In addition to frequency translation, the upconverters 56 may include an AGC to partially compensate for variable attenuation on the cables. AGC pilot, frequency distribution, and monitoring of the radio ports could be included in vacant parts of the coaxial cable bandwidth.

For upstream transmission, space diversity is the standard technique in cellular for overcoming multi-path. In cellular, space diversity is employed at the base station by using two receive antennas (micro-diversity) separated by a few wavelengths, which is sufficient to decorrelate multipath in the inbound direction and provide approximately 6 dB of gain under Rayleigh fading conditioned. The same micro-diversity technique could be used at the radio ports 34 of the PCN, although the complexity of the radio port and distribution network design would increase.

A multisite diversity scheme can also be employed in which the reception of the same remote transmission at adjacent microcells 18 is used. In addition to having a higher gain potential than micro-diversity, multisite diversity permits a more simplified implementation of the radio ports 34 and distribution network 40 by eliminating the need for an additional receive antenna and FDM channel per radio port.

According to the present invention, multisite diversity in the upstream direction is implemented by equipping each centralized channel unit 32 with a multisite diversity controller 68 which samples signals distributed to the channel unit 32 by the upstream cable distribution 72 from an area of microcells in the upstream direction. The multisite diversity controller 68 samples signals received from the microcells 18 in the column assigned the same set of carriers as the particular channel unit, as well as signals received in adjacent columns. Then, the multisite diversity controller 68 determines which of the signals is less attenuated and passes the stronger signal to the channel unit demodulator (not shown). As a result, the shadowing fading margin can be reduced to bring about an associated reduction in the required power output of the personal communications unit.

In addition, the multisite diversity controller 68 enables a simplified hand-off process by identifying the column of microcells over which the stronger signal is received. The PCN hub 30 uses this information to provide a continuous hand-off feature with simplified processing overhead to follow the personal user by selecting the best column of microcells in the PCN coverage for access to the personal user.

As shown in FIG. 5, the multisite diversity controller 68 of each channel unit 32 receives 12 FDM channels from FDM demultiplexer 62 via upstream cable distribution network 72. Six of the signals transmitted to the multisite diversity controller 68 are those received by the six microcells sharing the same set of frequencies as the channel unit 32. These signals, transmitted over the same upstream channel band via different cables, are designated "home." The other six signals come from six adjacent microcells using carrier sets different from that of the home column, and are divided into groups of three designated "right" and "left," according to the position of the columns relative to the home column.

The three signals in each of the left and right groups received by the multisite diversity controller 68 are transmitted by three of the six microcells of the columns situated immediately to the left and right, respectively, of the home column. In practice, the particular microcells used for the left and right groups could be selected on the basis of predicted mobility patterns within the PCN subnetwork (20).

In operation, FDM demultiplexer 62 converts the upstream FDM channel signals transmitted over the upstream cables 46 to the corresponding cellular channels. Signals transmitted over the band of upstream FDM channels corresponding to the carrier set of a particular group of channel units 32 are converted by the FDM demultiplexer and applied to the home inputs of the macro-diversity controllers 68 of the channel units via upstream cable distribution 72. Similarly, signals transmitted via selected upstream cables 46 corresponding to the selected microcells 18 over the bands of upstream FDM channels assigned to the adjacent columns are converted by the FDM demultiplexer 62 and applied to the left and right inputs of the particular multisite diversity controller 68.

In the internal hand-of scheme, a particular call is instantaneously served by time slots in carriers from the frequency set corresponding to the column of microcells with the stronger signal. As the personal communications unit moves across the various microcells of the PCN subnetwork (20, the control equipment at the PCN hub 30 implements a follow me feature, where the time slots are transferred from one microcell 18 to the next in an attempt to serve the call with the stronger carriers as determined by the multisite diversity controllers 68 in the centralized channel units 32 of the PC hub 30.

Having described the presently preferred embodiments of the invention, additional advantages and modifications will readily occur to those skilled in the art from consideration of the specification and practice of the invention disclosed herein. It is intended that the specification and examples be considered as exemplary only, with a true scope and spirit of the invention being indicated by the following claims.

What is claimed is:

1. A personal communications network, PCN, for use over allocated cellular communications channels, said PCN comprising a plurality of PCN subnetworks, each of said PCN subnetworks comprising:
   a plurality of microcells arranged in a multi-dimensional grid, said grid defining at least rows and columns of said microcells, wherein the allocated cellular communications channels are divided into sets of said cellular channels and each of said columns of said grid is assigned one of said sets for internal spectral reuse;
   a plurality of centralized channel units divided into groups, each of said columns corresponding to a respective group, and each of said channel units in said respective group including means for transmitting signals over the set of cellular channels assigned to the corresponding column; and
   a downstream distributor for distributing said signals transmitted by said channel units in said respective group to personal communications units positioned within said corresponding column.

2. The personal communications network of claim 1, wherein each of said PCN subnetworks is spaced at least a minimum distance apart from other Pc subnetworks, said minimum distance being sufficient such that substantial interference between signals transferred over the same cellular channels within different PCN subnetworks does not occur, enabling inter-PCN subnetwork frequency reuse.

3. The personal communications network of claim 1, wherein the columns assigned the same set of cellular channels within a subnetwork are spaced at least a minimum distance apart, said minimum distance being sufficient such that substantial interference between signals transferred over the same cellular channels within said PCN subnetwork does not occur, enabling said internal frequency reuse.

4. The personal communications network, PCN, of claim 1, wherein each of said columns is assigned an exclusive downstream band of channels and wherein said downstream distributor comprises:

a cellular downstream converter for converting signals transmitted over said cellular channels by channel units of said respective group to corresponding channels in the downstream band assigned to said corresponding column; and a plurality of radio ports, each of said radio ports being disposed within a respective microcell, wherein each of said radio ports includes:

a downstream receive interface including means for receiving signals converted by said cellular downstream converter to channels within the downstream band assigned to the column of said respective microcell, and a downstream transmit port including a downstream cellular converter for converting signals received by said downstream receive interface to the corresponding cellular channels, and means for transmitting the downstream cellular converted signals to personal communications units over said corresponding cellular channels.

5. The personal communications network of claim 4, wherein each downstream band of channels comprises a band of frequency division multiplex, FDM, channels, and said cellular downstream converter comprises a frequency division multiplexer for converting signals transmitted over cellular channels by channel units in said respective group to corresponding FDM channels within the downstream band assigned to said corresponding column.

6. The personal communications network of claim 5, wherein each downstream band of FDM channels comprises a bandwidth equivalent to that of the total of each of the allocated cellular communications channels.

7. The personal communications network of claim 5, wherein said downstream distributor further comprises:

a plurality of downstream wideband transmission media, each of said downstream wideband transmission media commonly connecting the downstream receive interface of each radio port disposed in a respective row of said grid to said frequency division multiplexer such that signals converted by said frequency division multiplexer are conducted to each of said downstream receive interfaces in said grid.

8. The personal communications network of claim 7, wherein each of said downstream wideband transmission media comprises a coaxial cable.

9. The personal communications network of claim 4 further comprising:

an upstream distributor for distributing signals transmitted by personal communications units positioned within a respective column to channel units in the group to which said respective column corresponds, wherein signals transmitted over respective cellular channels by said personal communications units are distributed to channel units which transmit over said respective cellular channels.

10. The personal communications network of claim 9, wherein said upstream distributor further comprises:

means for distributing signals transmitted by personal communications units positioned within columns adjacent to said respective column to channel units in the group to which said respective column corresponds, wherein signals transmitted over respective cellular channels of the set assigned to said respective column by personal communications units within said columns adjacent to said respective column are distributed to channels units which transmit over said respective channels.

11. The personal communications network of claim 9, wherein each of said columns is assigned an exclusive upstream band of channels, and wherein said upstream distributor further comprises:

upstream receive ports, each of said upstream receive ports being associated with a radio port of said respective column, including means for receiving signals transmitted over cellular channels by personal communications units, and a cellular upstream converter for converting the signals received from said personal communications units to corresponding channels in the upstream band assigned to said respective column;

upstream transmit interfaces, each of said upstream transmit interfaces being associated with a radio port of said respective column, for transmitting the signals converted by the associated cellular upstream converter over the corresponding channels in the upstream band assigned to said respective column; and an upstream cellular converter for converting signals transmitted by the upstream transmit interfaces of radio ports of said respective column and of columns adjacent to said respective column to the corresponding cellular channels, and for transmitting the upstream-cellular converted signals to channel units in the group to which said respective column corresponds, wherein signals transmitted over respective cellular channels of the set assigned to said respective column by personal communications units within said respective column and said columns adjacent to said respective column are transmitted to channels units which transmit over said respective channels.

12. The personal communications network of claim 11, wherein each downstream band of channels and each upstream band of channels comprises a band of frequency division multiplex, FDM, channels, said cellular downstream converter comprising a frequency division multiplexer for converting signals transmitted over cellular channels by channel units in said respective group to corresponding FDM channels within the band assigned to the corresponding column, and said upstream cellular converter comprising a frequency division demultiplexer for converting said signals transmitted over FDM channels by said upstream transmit interfaces of said respective column and of said columns adjacent to said respective column to the corresponding cellular channels within the set assigned to said respective column.

13. The personal communications network of claim 12, wherein each upstream band and each downstream band of FDM channels comprises a bandwidth equivalent to that of the total of each of the allocated cellular communications channels.

14. The personal communications network of claim 12, wherein said downstream distributor further comprises a plurality of downstream wideband transmission media, each of said downstream wideband transmission media commonly connecting the downstream receive interfaces of each radio port disposed in a respective row of said grid to said frequency division multiplexer such that signals converted by said frequency division multiplexer are conducted to each of said downstream receive interfaces in said grid, and wherein said upstream distributor further comprises a plurality of upstream wideband transmission media commonly connecting the upstream transmit interfaces of each radio port disposed in a respective row of said grid to said frequency division demultiplexer.

15. The personal communications network of claim 14, wherein each of said downstream wideband transmission media and each of said upstream wideband transmission media comprises a coaxial cable.

16. The personal communications network of claim 15, wherein said frequency division multiplexer comprises a plurality of cable multiplexers, each of said cable multiplexers being connected to a respective one of the downstream cables, and wherein each of said channel units includes a passive splitter for splitting the signals transmitted by each channel unit into a plurality of paths and for connecting each of said paths to a respective cable multiplexer such that the signals transmitted by each of said channel units in a respective group are transmitted in simulcast by the downstream transmit ports of the radio ports in the corresponding column.

17. The personal communications network of claim 12, wherein each of said channel units includes a multisite diversity controller for selecting the strongest of the signals received from said frequency division demultiplexer which correspond to a respective communications and for transmitting the selected signal to a base station controller, said base station controller including means for transmitting the selected signal to a switching center and means for transmitting signals from said switching center to selected channel units.

18. The personal communications network of claim 17, wherein each of said channel units includes means for indicating the column in said grid from which said selected signals was received on the basis of the upstream FDM channel over which said selected signal was transmitted, said base station controller including hand-off means for transmitting signals from said switching center which correspond to said respective communications to a channel unit in the group to which the column from which said selected signal corresponds.

19. The personal communications network of claim 17, wherein said switching center includes means for transferring signals between said base station controller and a public switched telephone network, and wherein said base station controller includes means for transferring signals between said channel units and a private branch exchange network.

20. The personal communications network of claim 8, wherein each of said channel units includes means for transmitting signals over time slots of said cellular channels, each of said time slots being assigned to a respective personal communications unit.

21. A personal communications network, PCN, for use over allocated cellular communications channels, said PCN comprising a plurality of PCN subnetworks, each of said PCN subnetworks comprising:

a plurality of microcells arranged in a multi-dimensional grid, said grid defining at least rows and columns of said microcells, wherein cellular communications channels allocated to the subnetwork are divided into sets of said channels and wherein each of said columns of said grid is assigned one of said sets;

a multisite diversity controller for receiving signals transmitted by personal communications units positioned within a respective column but received in other columns and comparing the quality of the received signals; and a hand-off controller for reassigning personal communications units from one column to another in response to said comparison by said multisite diversity controller by changing the channels to which corresponding microcells are assigned.

22. The personal communications network of claim 21, further comprising:

an upstream distributor for distributing signals transmitted by personal communications units positioned within a respective column to channel units in the group to which said respective column corresponds, wherein signal transmitted over respective cellular channels by said personal communications units are distributed to channel units which transmit over said respective cellular channels;

said upstream distributor further comprising means for distributing signals transmitted by personal communications units positioned within columns adjacent to said respective column to channel units in the group to which said respective cellular channels of the set assigned to said respective column by personal communications units within said columns adjacent to said respective column are distributed to channels units which transmit over said respective channels; and wherein said multisite diversity controller compares the quality of the signals of adjacent columns by said channel units.

23. The personal communications network of claim 22, wherein each of said columns is assigned an exclusive upstream band of channels, and wherein said upstream distributor comprises:

upstream receive ports, each of said upstream receive ports being associated with a radio port of said respective column, including means for receiving signals transmitted over cellular channels by personal communications units, and a cellular upstream converter for converting the signals received from said personal communications units to corresponding channels in the upstream band assigned to said respective column;

upstream transmit interfaces, each of said upstream transmit interfaces being associated with a radio port of said respective column, for transmitting the signals converted by the associated cellular upstream converted over the corresponding channels in the upstream band assigned to said respective column; and an upstream cellular converter for converting signals transmitted by the upstream transmit interfaces of radio ports of said respective column and of columns adjacent to said respective column to the corresponding cellular channels, and for transmitting the upstream-cellular converted signals to channel units in the group to which said respective column corresponds, wherein signals transmitted over respective cellular channels of the set assigned to said respective column bu personal communications units within said respective column and said columns adjacent to said respective column are transmitted to channels units which transmit over said respective channels.

24. The personal communications network of claim 23 wherein each upstream band of channels comprises a band of frequency division multiplex, FDM, channels, said upstream cellular converter comprising a frequency division demultiplexer for converting said signals transmitted over FDM channels by said upstream transmit interfaces of said respective column and of said columns adjacent to said respective column to the corresponding cellular channels within the set assigned to said respective column and wherein said multisite diversity controller compares the quality of received signals by comparing the quality of the signals received from said demultiplexer which correspond to a respective communication.

25. The personal communications network of claim 21 wherein the multisite diversity controller selected the strongest of said received signals for transmission to a communications switching center of the personal communications network, 26. A personal communications network, PCN, for use over allocated cellular communications channels, said PCN comprising a plurality of PCN subnetworks, each of said PCN subnetworks comprising:
   a plurality of microcells arranged in a multi-dimensional grid, said grid defining at least rows and columns of said microcells, wherein the allocated cellular channels are divided into sets of said cellular channels and each of said columns of said grid is assigned one of said sets for internal spectral reuse;
   an upstream distributor for distributing signals transmitted by personal communications units positioned within a respective column to channel units in the group to which said respective column corresponds, wherein signals transmitted over respective cellular channels by said personal communications units are distributed to channel units which transmit over said respective cellular channels;
   said upstream distributor further comprising means for distributing signals transmitted by personal communications units positioned within columns adjacent to said respective column to channel units in the group to which said respective column corresponds, wherein signals transmitted over respective cellular channels of the set assigned to said respective column by personal communications units within said columns adjacent to said respective column are distributed to channels units which transmit over said respective channels; and
   a multisite diversity controller for selecting the strongest of said transmitted signals of a respective cellular channel for transmission to a communications switching center of the personal communications network.

27. The personal communications network of claim 26, wherein each of said columns is assigned an exclusive upstream band of channels, and wherein said upstream distributor comprises:
   upstream receive ports, each of said upstream receive ports being associated with a radio port of said respective column, including means for receiving signals transmitted over cellular channels by personal communications units, and a cellular upstream converter for converting the signals received from said personal communications units to corresponding channels in the upstream band assigned to said respective column;
   upstream transmit interfaces, each of said upstream transmit interfaces being associated with a radio port of said respective column, for transmitting the signals converted by the associated cellular upstream converter over the corresponding channels in the upstream and assigned to said respective column; and
   an upstream cellular converter for converting signals transmitted by the upstream transmit interfaces of radio ports of said respective column and of columns adjacent to said respective column to the corresponding cellular channels, and for transmitting the upstream-cellular converted signals to channel units in the group to which said respective column corresponds,
   wherein signals transmitted over respective cellular channels of the set assigned to said respective column by personal communications units within said respective column and said columns adjacent to said respective column are transmitted to channels units which transmit over said respective channels.

28. The personal communications network of claim 27 wherein each upstream band of channels comprises a and of frequency division multiplex, FDM, channels, said upstream cellular converter comprising a frequency division demultiplexer for converting said signals transmitted over FDM channels by said upstream transmit interfaces of said respective column and of said columns adjacent to said respective column to the corresponding cellular channels within the set assigned to said respective column and wherein said multisite diversity controller selects from among the signals received from said demultiplexer which correspond to a respective communication.

* * * * *

UNITED STATES PATENT AND TRADEMARK OFFICE
CERTIFICATE OF CORRECTION

PATENT NO. : 5,303,287

DATED : April 12, 1994

INVENTOR(S) : Enrique Laborde

It is certified that error appears in the above-identified patent and that said Letters Patent is hereby corrected as shown below:

In Column 6, line 26, change "rid" to --grid--.

In Column 10, line 16, change "hand-of" to --hand-off--.

In Column 10, claim 2, line 3, change "Pc" to --PCN--.

In Column 13, claim 17, line 6, change "communications" to --communication--.

In Column 13, claim 18, line 4, change "signals" to --signal--.

In Column 14, claim 23, line 18, change "converted" to --converter--.

In Column 15, claim 23, line 31, change "bu" to --by--.

In Column 15, claim 23, line 33, change "channels" to --channel--.

In Column 15, claim 25, line 2, change "selected" to --selects--.

In Column 16, claim 28, line 3, change "and" to --band--.

Signed and Sealed this

Fifteenth Day of August, 1995

Attest:

BRUCE LEHMAN

*Attesting Officer*        *Commissioner of Patents and Trademarks*